US008750226B2

(12) United States Patent
Ludwig (10) Patent No.: US 8,750,226 B2
(45) Date of Patent: Jun. 10, 2014

(54) PERFORMANCE MONITORING IN A COMMUNICATION NETWORK (75) Inventor: Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 13/376,344

(22) PCT Filed: Jun. 10, 2009

(86) PCT No.: PCT/EP2009/057220
§ 371 (c)(1),
(2), (4) Date: Jan. 11, 2012

(87) PCT Pub. No.: WO2010/142335
PCT Pub. Date: Dec. 16, 2010

(65) Prior Publication Data
US 2012/0106355 A1 May 3, 2012

(51) Int. Cl.
H04W 80/04 (2009.01)
H04W 88/06 (2009.01)
H04W 28/04 (2009.01)
H04W 72/04 (2009.01)
H04W 84/08 (2009.01)
H04W 48/08 (2009.01)

(52) U.S. Cl.
USPC ............ 370/329; 370/341; 370/431; 370/392

(58) Field of Classification Search
CPC ..... H04W 80/04; H04W 88/06; H04W 28/04; H04W 72/04; H04W 84/08; H04W 48/08; H04L 45/00; H04L 29/0653; H04L 29/06; H04L 12/2801
USPC .......................... 370/328, 329, 341, 392, 431
See application file for complete search history.

(56) References Cited

U.S. PATENT DOCUMENTS

| 6,097,699 | A | 8/2000 | Chen et al. |
| 2004/0052259 | A1 | 3/2004 | Garcia et al. |
| 2005/0130690 | A1* | 6/2005 | Shinozaki ..................... 455/522 |
| 2007/0147258 | A1 | 6/2007 | Mottishaw et al. |
| 2007/0253365 | A1 | 11/2007 | Hedberg et al. |
| 2007/0259673 | A1 | 11/2007 | Willars et al. |

FOREIGN PATENT DOCUMENTS

| JP | 2001333092 A | 11/2001 |
| JP | 2002517943 A | 6/2002 |
| JP | 2002261931 A | 9/2002 |
| JP | 2003110620 A | 4/2003 |
| JP | 2004112791 A | 4/2004 |
| JP | 2007174668 A | 7/2007 |
| JP | 2008182433 A | 8/2008 |
| JP | 2009206769 A | 9/2009 |

OTHER PUBLICATIONS

Ludwig, R. et al. "An Evolved 3GPP QoS Concept." Internet Citation [online], pp. 388-392, XP002482553, [retrieved on Jun. 2, 2008] Retrieved from the Internet <URL: http://ieeexplore.ieee.org/iel5/11096/35441/01682842.pdf?tp=&isnumber=&arnumber=1682842>.

* cited by examiner

Primary Examiner — Ronald Abelson
(74) Attorney, Agent, or Firm — Coats & Bennett, PLLC (57) ABSTRACT In a mobile communication network, the data traffic is mapped to a number of bearers (52, 54) between a terminal (10) and a gateway (26). Upon a triggering event, data packets of a specific type, which are to be monitored, are assigned to a monitoring bearer (54), which is dedicated for performance monitoring purposes. The monitoring bearer (54) and a transport bearer for carrying data packets of said specific type between a non-monitored terminal and the gateway (26) have the same traffic forwarding policy. Data packets may then be filtered from the monitoring bearer (54) at a desired node between the terminal (10) and the gateway (26), and a performance parameter may be evaluated on the basis of the filtered data packets.

16 Claims, 8 Drawing Sheets

PERFORMANCE MONITORING IN A COMMUNICATION NETWORK

TECHNICAL FIELD

The present invention relates to techniques for performance monitoring in a communication network.

BACKGROUND

In mobile communication networks it is known to direct network traffic related to a specific service to a bearer with a certain quality of service (QoS). In this respect, a bearer is considered to be an information transmission context or path of defined characteristics, e.g.

capacity, delay and/or bit error rate. Typically, a number of bearers will be established between a gateway of a mobile communication network and a user equipment, e.g. a mobile phone or other type of mobile terminal. A bearer may carry downlink (DL) data traffic in a direction from the network to the user equipment, and may carry data traffic in an uplink (UL) direction from the user equipment to the network. In the gateway and in the user equipment the data traffic, which includes a plurality of IP data packets (IP: "Internet Protocol") can be filtered using IP 5-tuple packet filters, thereby directing the IP data packets to a desired bearer.

For performance monitoring, a packet flow associated with a certain terminal or service needs to be filtered out from the network traffic of the communication network. This typically requires significant processing resources. For example, it may be necessary to process multiple protocol header fields, e.g. source or destination IP address, source or destination port numbers, or the like, of all data packets crossing a transport network interface. With increasing transport network bitrates, the required processing resources increase as well.

Accordingly, there is a need for reliable and efficient techniques for performance monitoring in a communication network.

SUMMARY

According to an embodiment of the invention, a method of performance monitoring is provided. According to the method, upon a triggering event, data packets of a specific type are assigned to a monitoring bearer between a terminal and a gateway. The monitoring bearer is dedicated for performance monitoring purposes. The monitoring bearer and a transport bearer for carrying data packets of said specific type between a non-monitored terminal and the gateway have the same traffic forwarding policy.

According to a further embodiment of the invention, a network component is provided. The network component comprises a controller. The controller is configured to detect a triggering event. Upon the triggering event, the controller assigns data packets of a specific type to a monitoring bearer between a terminal and a gateway. The monitoring bearer is dedicated for monitoring purposes. The monitoring bearer and a transport bearer for carrying data packets of said specific type between a non-monitored terminal and the gateway have the same traffic forwarding policy.

According to a further embodiment of the invention, a network component is provided. The network component comprises a monitoring filter configured to filter data packets from a monitoring bearer between a terminal and a gateway. The monitoring bearer is dedicated for monitoring purposes and carries data packets of a specific type. The monitoring bearer and a transport bearer for carrying data packets of said specific type between a non-monitored terminal and the gateway have the same traffic forwarding policy.

According to a further embodiment of the invention, a network component is provided. The network component comprises a gateway with a downlink filter section. The downlink filter section is configurable to route data packets of a specific type to a monitoring bearer between the gateway and a terminal. The monitoring bearer is dedicated for monitoring purposes. The monitoring bearer and a transport bearer for carrying data packets of said specific type between a non-monitored terminal and the gateway have the same traffic forwarding policy.

According to a further embodiment of the invention, a terminal is provided. The terminal, which may be a user equipment or a dedicated monitoring terminal, comprises an uplink filter section. The uplink filter section is configurable to route data packets of a specific type to a monitoring bearer between the terminal and a gateway. The monitoring bearer is dedicated for monitoring purposes. The monitoring bearer and a transport bearer for carrying data packets of said specific type between a non-monitored terminal and the gateway have the same traffic forwarding policy.

DETAILED DESCRIPTION OF EMBODIMENTS

In the following, the invention will be explained in more detail by referring to exemplary embodiments and to the accompanying drawings. The illustrated embodiments relate to performance monitoring of data traffic in a mobile communication network, e.g. according to the 3GPP (Third Generation Partnership Project) specifications. However, it is to be understood that the concepts as described herein may also be applied to other types of communication networks.

Figure 1:
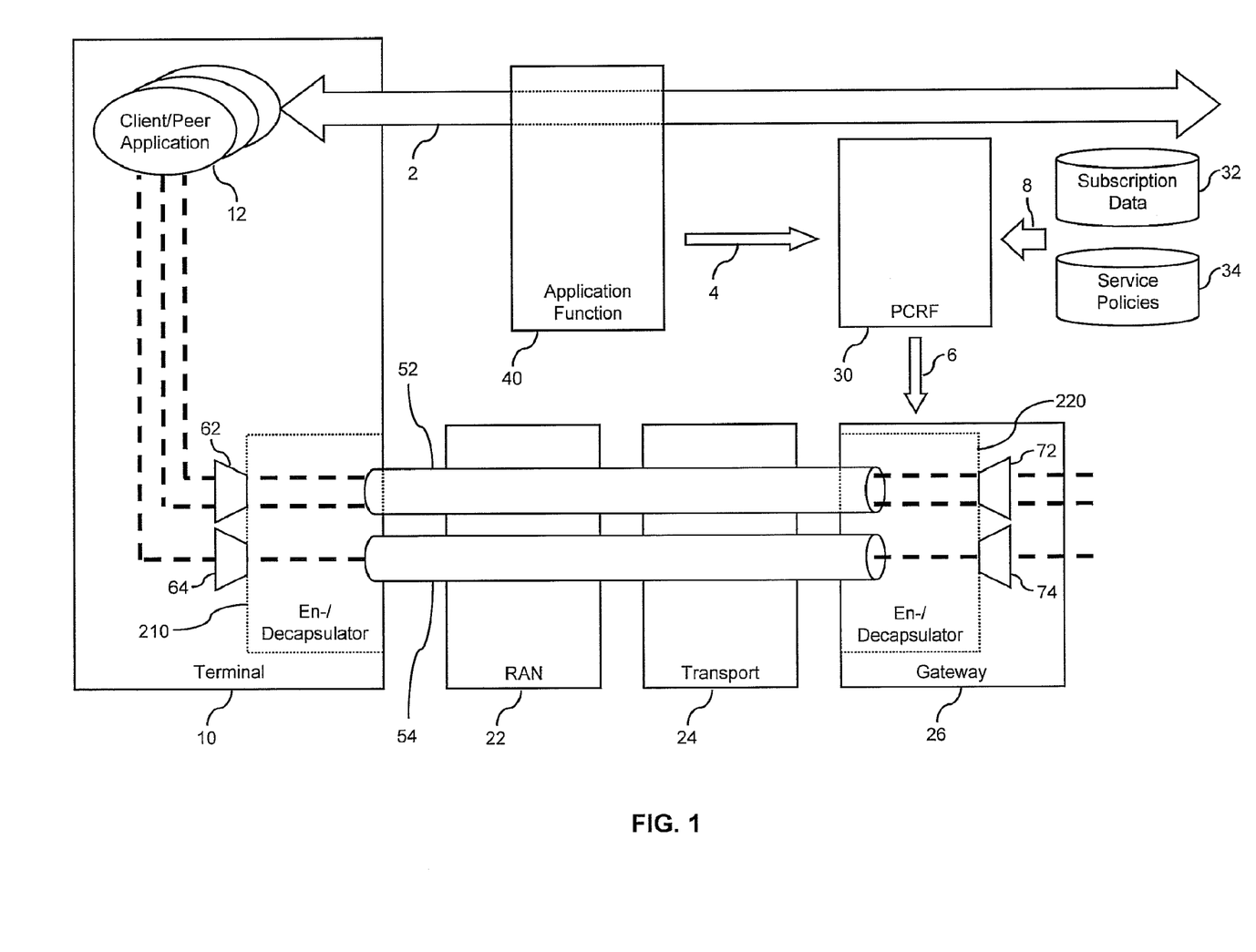
FIG. 1 schematically illustrates a mobile communication environment in which performance monitoring according to embodiments of the invention may be applied.

FIG. 1 schematically illustrates a mobile communication environment in performance monitoring is implemented in accordance with an embodiment of the invention.

The network environment includes a terminal 10, which may be a user equipment, e.g. a mobile phone, or a dedicated monitoring terminal, and a number of network components 22, 24, 26, 30, 40. Among these network components there is a Radio Access Network (RAN) 22. The RAN 22 is based on a certain type or certain types of radio access technology, e.g. GSM (Global System for Mobile Communications), EDGE (Enhanced Data Rate for GSM Evolution), or UMTS (Universal Mobile Telecommunications System). Although the RAN 22 is illustrated as a single node, it is to be understood that the RAN 22 may actually be formed of a number of components, which are not further explained herein. The RAN 22 is coupled to a transport node 24, which in turn is coupled to a gateway 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services (GPRS: "General Packet Radio Service") to one or more external packet data networks. The gateway 26 may also be a System Architecture Evolution Gateway (SAE GW) according to the 3GPP specifications.

In addition, the mobile communication network includes a policy controller 30, which is implemented as a Policy and Charging Rules Function (PCRF) according to the 3GPP specifications. The policy controller may be implemented by dedicated hardware or as a software function executed by a processor.

As further illustrated, the mobile communication network includes an application function 40. The application function may implement an Call Session Control Function (CSCF) of an IP Multimedia Subsystem (IMS), a Mobile TV (MTV) server, or the like. The application function 40 communicates with the terminal 10 and/or other network components using an application layer signalling path 2, e.g. implemented using the Session Initiation Protocol (SIP), the Real Time Streaming Protocol (RTSP), or the like. Further, the application function 40 communicates with the policy controller using a signalling path 4, which may be implemented using the Rx interface according to the 3GPP specifications.

The gateway 26, the policy controller 30, and the application function are typically regarded as components of a core network.

The policy controller 30 communicates with the gateway 26 via a signalling path 6, which may be implemented using the Gx interface according to the 3GPP specifications.

The policy controller 30 is further coupled to a subscription database 32 and to a service policy database 34 via a signalling path 8, e.g. implemented using a Sp interface according to the 3GPP specifications. The policy controller 30 may thus receive policy data relating to a specific user and/or relating to a specific service available in the mobile communication network, e.g. MTV.

The policy controller 30 thus provides interfaces for supporting the signalling paths 4, 6, 8. It is to be understood that further interfaces may be supported as well.

As further illustrated, service-related data traffic between the network and the terminal 10 is carried by a number of bearers 52, 54. The service-related data traffic typically pertains to one or more client/peer applications 12 running on the terminal equipment 10. The bearers 52, 54 are established between the terminal equipment 10 and the gateway 26. Typically, the bearers 52, 54 carry data traffic in both the DL direction and the UL direction, i.e. may also be regarded as being formed of a DL bearer and a UL bearer. For supporting bidirectional communication on the bearers 52, 54, the terminal 10 is provided with a transceiver structure, i.e. both a receiver for receiving incoming data packets from the bearers 52, 54 and a transmitter for sending outgoing data packets on the bearers 52, 54. Each bearer 52, 54 may be associated with a corresponding QoS profile. Parameters of the QoS profile may be a QoS class identifier (QCI), an allocation/retention priority (ARP), a maximum bit rate (MBR), and/or a guaranteed bit rate (GBR). Accordingly, each bearer 52, 54 may be associated with a corresponding QoS class.

Bearers which substantially have the purpose of carrying data traffic will in the following also be referred to as transport bearers. That is to say, for carrying data packets of a specific type, a transport bearer will be established between a non-monitored terminal and the gateway 26. As compared to that, special purpose bearers used in performance monitoring methods according to embodiments of the invention will be referred to as monitoring bearers. According to embodiments of the invention, a monitoring bearer will be established between a monitored terminal, e.g. the terminal 10, and the gateway 26 for carrying data packets of a specific type to be monitored. As used herein, a non-monitored terminal is a terminal for which data packets of this specific type are not subjected to performance monitoring using a dedicated monitoring bearer. Nonetheless, it is to be understood that this non-monitored terminal may be monitored using other methods or may be a monitored terminal with respect to other types of data packets. According to an embodiment, the data packets of a specific type relate to a specific service which is to be monitored. Also, it is to be understood, that the same terminal, e.g. the terminal 10, may be a non-monitored terminal and then become a monitored terminal and vice-versa, e.g. in response to a triggering event, such as a specific service being used on the terminal. The triggering event may also be that a specific service is used by a specific user.

In the illustration of FIG. 1, the bearer 54 is a monitoring bearer. That is to say, the bearer 54 is dedicated for performance monitoring purposes. The monitoring bearer 54 will thus exclusively carry data traffic which is to be monitored. If data traffic of a specific type, e.g.

relating to a specific terminal and/or to a specific service, is to be monitored, this data traffic is routed to the monitoring bearer 54, rather than being routed to a transport bearer in the usual manner. The routing of data packets to a desired bearer is accomplished by a correspondingly configured UL filter section with UL packet filters 62, 64 in the terminal equipment 10 and by a correspondingly configured DL filter section with DL packet filters 72, 74 in the gateway 26. The UL packet filters 62, 64 and/or the DL packet filters 72, 74 may be implemented as IP 5-tuple filters, i.e. operate on an information entity referred to as "IP 5-tuple", which will be further explained in connection with FIGS. 4 and 5. The routing process may also involve establishing the monitoring bearer 54. Establishing the monitoring bearer and configuration of the DL packet filters 72, 74 is controlled by signalling from the policy controller 30 to the gateway 26 using the signalling path 6. Configuration of the UL packet filters 62, 64 used in the terminal equipment 10, may be accomplished by signalling from the policy controller 30 via the gateway 26.

The use of the monitoring bearer 54 in performance monitoring will now be further explained in the context of an embodiment of the invention. According to this embodiment, data packets which are not to be monitored are routed to a corresponding transport bearer (not shown in FIG. 1). The transport bearer is associated with a QCI and a corresponding traffic forwarding policy. The QCI is communicated from the policy controller 30 to a gateway 26 using the signalling path 6. If data packets of this specific type are to be monitored, this is indicated to the policy controller 30, e.g. by having the application function 40 sending respective information to the policy controller 30 using the signalling path 4. The policy controller 30 thus detects a triggering event indicating that data packets of the specific type are to be monitored. The triggering event may be based on policy data. For example, the controller may conclude that a specific service and/or terminal is to be monitored depending on the time of day, the day of week or on positioning data, e.g. location and/or speed, of the terminal. The policy controller 30 then reassigns the data packet of this specific type from the normal transport bearer to the monitoring bearer 54, which is associated with a special purpose QCI dedicated for performance monitoring purposes. This may also involve establishing the monitoring bearer 54 and may also involve deactivating the normal transport bearer. The new mapping of the data packets to the monitoring bearer 54, and optionally also information required to establish the monitoring bearer 54, is signalled from the policy controller 30 to the gateway 26. In the gateway 26, the filter section including the DL filters 72, 74 is reconfigured to route the data packets to be monitored to the monitoring bearer 54. If monitoring of UL traffic is to be accomplished as well, the respective information is propagated from the policy controller 30 via the gateway 26 and further intermediate nodes, e.g. the RAN 22, to the terminal 10.

The normal transport bearer and the monitoring bearer 54 are thus identified by different QCIs. However, according to an embodiment, these different QCIs may be associated with the same traffic forwarding policy. That is to say, the monitoring bearer 54 may thus be configured to provide the same traffic transport characteristics as the corresponding normal transport bearer. In this way, performance monitoring results obtained using data packets filtered from the monitoring bearer 54 accurately represent the usual handling of data traffic.

In accordance with the above concepts, a dedicated QCI is thus used exclusively for performance measurements, such as tracing of traffic. These dedicated QCIs may be taken from the range of QCIs as defined by the 3GPP specifications. However, other QCIs may be used as well.

Once the data traffic is no longer to be monitored, this may again be indicated to the policy controller 30, and the policy controller 30 may reassign the data packets of the specific type to the normal transport bearer.

It is to be understood, that a communication network may use a number of different transport bearers for carrying different types of data traffic. These different transport bearers, e.g. as illustrated by the bearer 52, may be associated with different QoS profiles and may be associated with different QCIs. For performance monitoring of data traffic of multiple transport bearers, multiple monitoring bearers may be established, each associated with a different QCI dedicated for performance monitoring purposes.

For performance monitoring, data packets may then be filtered from the monitoring bearer 54 and evaluated. By using the monitoring bearer 54, which is dedicated for performance monitoring purposes and thus exclusively carries data traffic which is to be monitored, this can be accomplished without requiring excessive processing resources.

Figure 2:
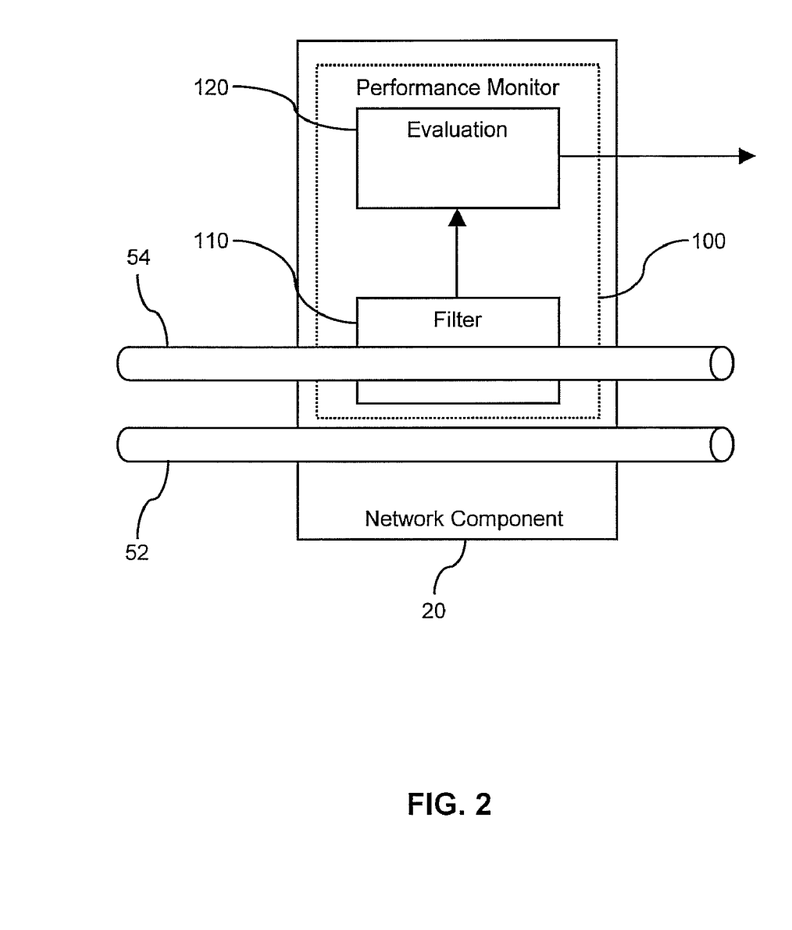
FIG. 2 schematically illustrates a network component according to an embodiment of the invention.

A network component 20 configured to accomplish performance monitoring on the basis of data packets filtered from the monitoring bearer 54 is schematically illustrated in FIG. 2. The network component 20 may be any network component along the path of the monitoring bearer 54 between the gateway 26 and the terminal 10. For example, the network component 20 used as a monitoring node may be the gateway 26, the transport node 24, or the RAN 22.

As illustrated in FIG. 2, the network component 20 comprises a performance monitor 100, which is provided with a monitoring filter 110 and an evaluation logic 120. The performance monitor 100 may be implemented by dedicated hardware or as a software function executed by a processor.

The monitoring filter 110 filters the data packets from the monitoring bearer 54. According to one option, the monitoring filter 110 may simply extract all data packets communicated on the monitoring bearer 54. According to other options, further selections may be carried out by the monitoring filter 110. The evaluation logic 120 then evaluates a performance parameter on the basis of the data packets as filtered from the monitoring filter bearer 54. The performance parameter may pertain to the terminal 10 in general or pertain to a specific service or specific services used by the terminal 10. The performance parameter may be a data throughput, a packet delay, a packet loss rate, or the like. The performance parameter as evaluated by the performance monitor 100 may then be output to other network components. Filtering of the data packets from the monitoring bearer 54 may be accomplished on the basis of the monitoring bearer's identity, e.g. on the basis of a bearer identifier. However, e.g. in some nodes of the transport network, information concerning the bearer identity may not be available. According to an embodiment of the invention, this situation is addressed by additionally associating the monitoring bearer 54 with a Differentiated Services Code Point (DSCP) dedicated for performance monitoring purposes. The DSCP will be further explained in connection with FIG. 4-6. This DSCP may be included in an outer IP header of the data packet to be monitored. According to an embodiment, the outer IP header is a GPRS Tunnelling Protocol (GTP) header. That is to say, according to an embodiment of the invention, the data packets to be monitored may be encapsulated in the gateway 26 and provided with an outer IP header including the dedicated DSCP for performance monitoring and associated with the dedicated QCI for performance monitoring. In a transport network node without any direct access to information concerning the bearer identity, the data packets to be monitored may thus be filtered from the data traffic on the basis of the dedicated DSCP. In the UL direction, this "tagging" of the data packet to be monitored may be accomplished by an encapsulator/decapsulator 210 provided in the terminal 10. Similarly, in the DL direction tagging of the data packets to be monitored with the dedicated DSCP may be accomplished by an encapsulator/decapsulator 220.

Accordingly, the mobile communication network thus may support a number of QoS classes associated with different bearers. The QoS classes may be identified by a corresponding QCI. For monitoring data packets of a specific service, a QCI dedicated for monitoring purposes may be defined. Further, a DSCP dedicated for monitoring purposes may be defined, e.g. from the range of non-standardized DSCPs.

According to an embodiment, the monitoring of the data packets may be implemented depending on policy data. That is to say, in addition to initiating the monitoring process by a triggering event, assigning of data packets to the monitoring bearer may also be accomplished on the basis of subscription data of a user of the terminal 10, a time of day, a day of week, a volume quota, subscriber groups, and/or positioning data of the terminal 10, e.g. the location or speed of the terminal 10. The data packets may thus be assigned to the monitoring identifier if they have a certain service identifier, if they relate to a terminal having a certain identifier, e.g. a certain International Mobile Subscriber Identity (IMSI), or if the subscription data of a user of said terminal indicate that monitoring is required. Further, assigning the data packets to the monitoring bearer may be activated or deactivated depending on the time of day or depending on the day of week. For example, this may be used for monitoring the data traffic of the terminal 10 only during normal working hours. Similarly, using positioning data allows for monitoring the data traffic only if the terminal 10 is located in a certain area, i.e. in an area of low network coverage.

Figure 3:
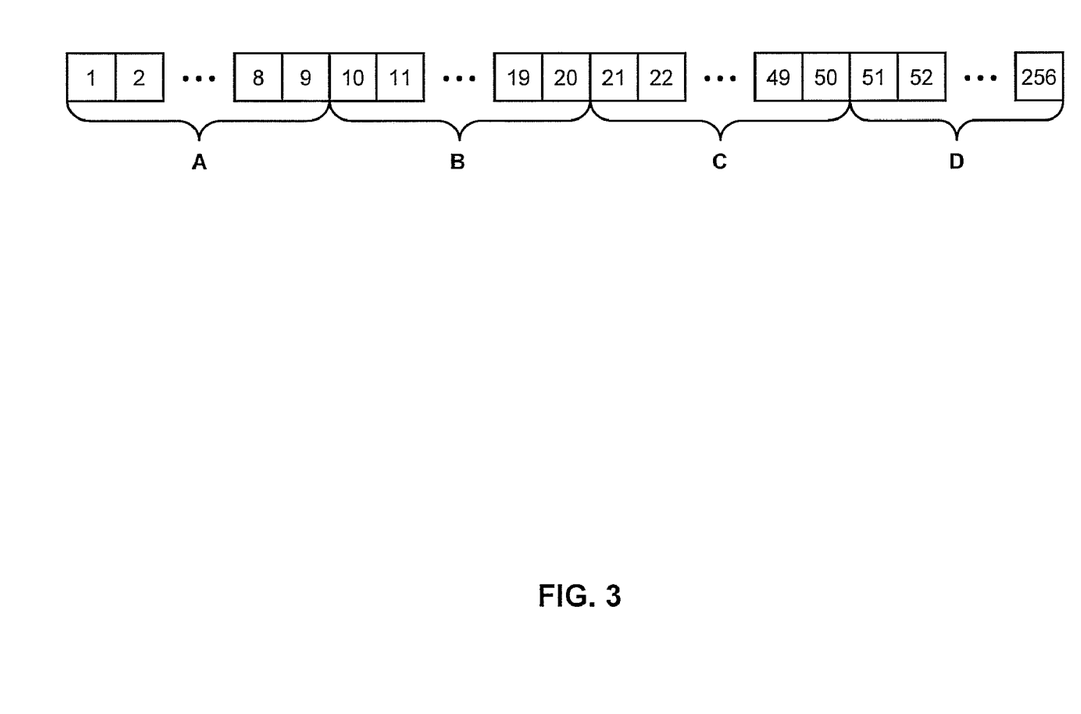
FIG. 3 schematically illustrates Quality of Service Class Identifiers as used in an embodiment of the invention.

FIG. 3 schematically illustrates QCIs which may be used for implementing the above concepts.

As used herein, a QCI is an identifier used to designate a certain traffic forwarding policy. As illustrated in FIG. 3 and described in the 3GPP specifications, a QCI may be an 8 bit integer, i.e. range from 1 to 256. FIG. 3 shows different ranges of QCIs which have been designated by "A", "B", "C", and "D".

The range "A", which extends from QCI 1 to QCI 9 are already standardized according to the 3GPP technical specification 23.203 Release 8. The QCIs of range B, i.e. from QCI 10 to QCI 20, and of range C, i.e. from QCI 21 to QCI 50, are reserved to be standardized in future releases. The QCIs of range D, i.e. from QCI 51 to QCI 256, may be used up to operator policy, e.g. within a public land mobile land network or in accordance with roaming agreements between different operators. The QCIs of the ranges A and B are also referred to as generic QCIs, whereas the QCIs of range C are also referred to as special purpose QCIs. According to an embodiment of the invention, the monitoring bearer 54 is associated with a QCI selected from the range of special purpose QCIs.

In the following, concepts of monitoring data packets will be explained in more detail by referring to exemplary types of data packets.

Figure 4:
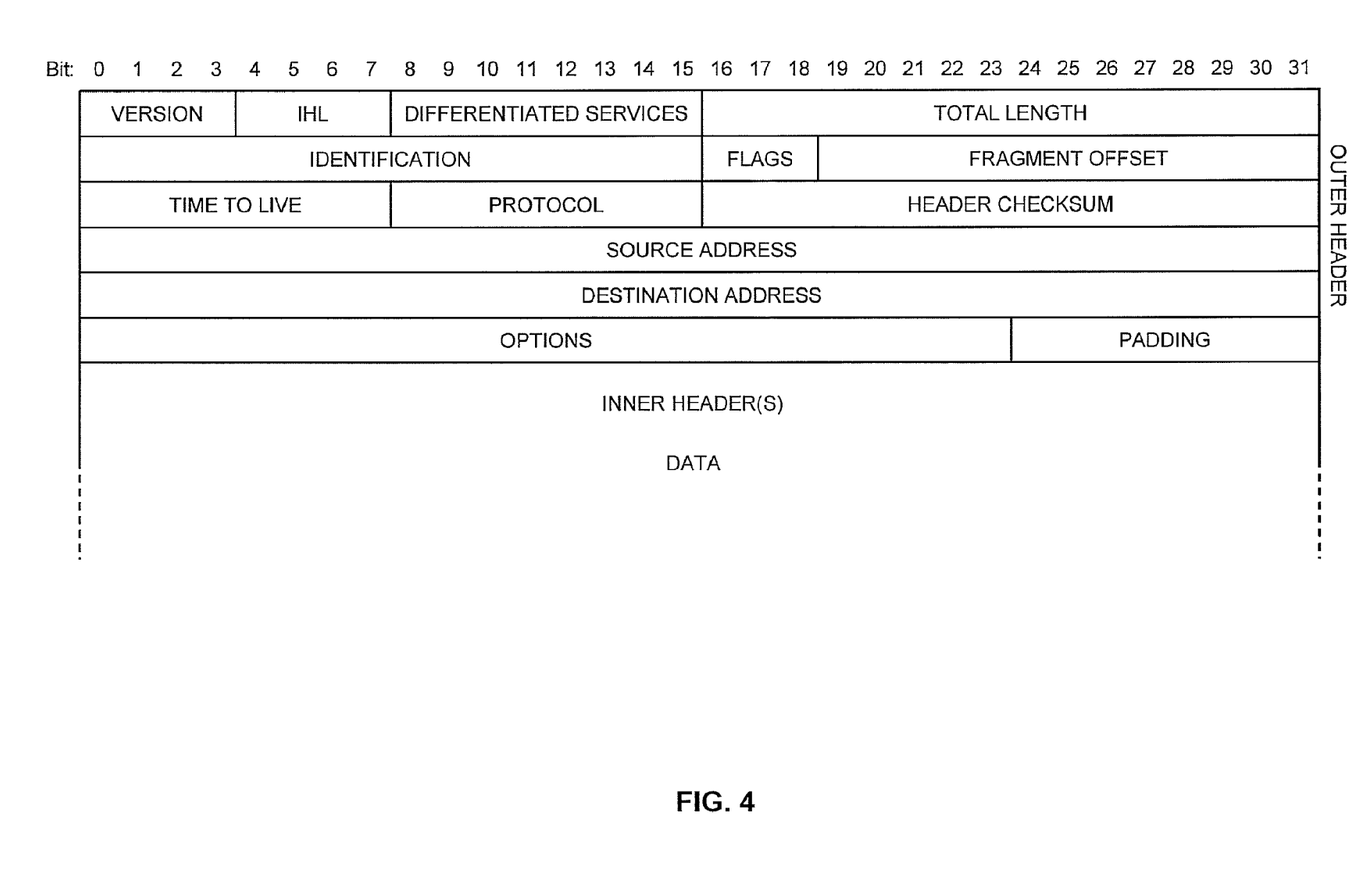
FIG. 4 schematically illustrates an example of a data packet as used in an embodiment of the invention.

FIG. 4 schematically illustrates IP data packets of the IP version 4 type. As illustrated, an outer header section of the data packets includes several information fields, which are referred to as "Version", "IHL (IP Header Length)", "Differentiated Services", "Total Length", "Identification", "Flags", "Fragment Offset", "Time to Live", "Protocol", "Header Checksum" "Source Address", "Destination Address", "Options", and "Padding". Details concerning these fields are defined in the RFC 791 Specification. The information field termed as "Differentiated Services" is defined in the RFC 2475 Specification. In addition, the header section of an IP data packet will also include information fields which are referred to as "Source Port" and "Destination Port". Corresponding information fields are defined, for example, by the Transport Control Protocol (TCP) defined in the RFC 793 Specification and the User Datagram Protocol (UDP) as defined in the RFC 768 Specification.

Following the header section, IP data packets are typically provided with a data section, in which different types of payload data traffic and optionally one or more inner header sections may be included.

Figure 5:
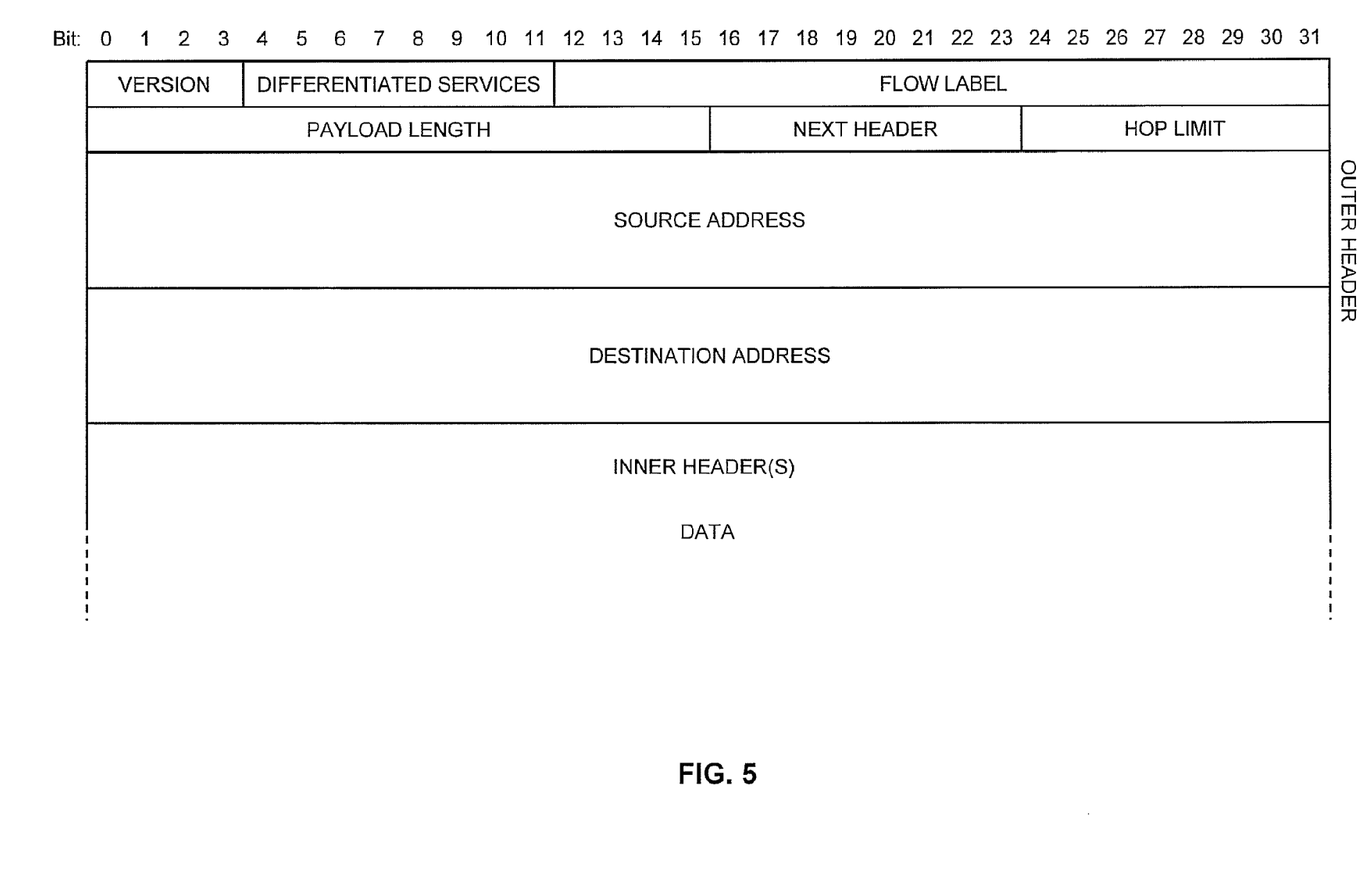
FIG. 5 schematically illustrates a further example of a data packet as used in an embodiment of the invention.

FIG. 5 schematically illustrates IP data packets according to the IP version 6 type. Again, an outer header section includes a number of information fields, which are referred to as "Version", "Differentiated Services", "Flow Label", "Payload Length", "Next Header", "Hop Limit", "Source Address", and "Destination Address". This structure of the header section is defined in the RFC 2460 Specification. In addition, the outer header section may also comprise information fields termed as "Source Port" and "Destination Port", e.g. as defined by the TCP or UDP. Again, the header section will typically be followed by a data section which may carry various types of payload data and optionally also one or more inner header sections.

For the purposes of the present disclosure, only the information field referred to as "Differentiated Services", "Source Address", "Destination Address", "Source Port", and "Destination Port" will be further discussed. As regards the other information fields, further explanations can be taken from the above-mentioned RFC Specifications.

The information field "Source Address" indicates the IP address from which a data packet originates. Similarly, the information field "Destination Address" indicates the IP address for which the data packet is destined. In IP version 4, the source address and the destination address are 32 bit values. In IP version 6, the source address and the destination address are 128 bit values.

The information field "Source Port" indicates a port number at the source of the data packet, whereas the information field "destination port" indicates a port number at the destination point of the data packet.

On the basis of the source address, the destination address, the source port, and the destination port, an IP packet flow can be defined as a flow of IP packets between a first endpoint defined by the source address and the source port, and a second endpoint defined by the destination address and the destination port. An information entity including the source address, the destination address, the source port, the destination port and a protocol identifier is also referred to as "IP 5-tuple".

The information field "Differentiated Services" is included in both IP version 4 data packets and in IP version 6 data packets. As defined in the RFC 2474 Specification, the information field "Differentiated Services" is an 8 bit value. The structure of this information field is schematically illustrated in FIG. 6.

Figure 6:
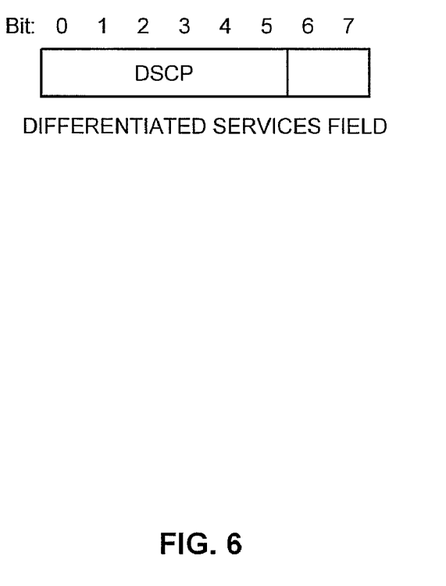
FIG. 6 schematically illustrates an information field in a header section of data packets.

As illustrated in FIG. 6, six bits of the information field, i.e. bits 0-5, are used to define the Differentiated Services Code Point (DSCP). The other two bits are unused. Using the DSCP, forwarding of the data packets by network nodes may be controlled. For data packets pertaining to different types of services different forwarding procedures may be selected. DSCPs may be standardized. Further, a range of non-standardized DSCPs is available.

In the following, the above concepts of performance monitoring will be further explained by referring to a specific example. According to this example, it will be assumed that the terminal is identified by an identifier, e.g. by IMSI which is known to the policy controller 30. For example, the identifier may have been preconfigured in the policy controller 30 or may have been signalled from the application function 40. The terminal 10 may be a dedicated measurement terminal or may be any type of user equipment. In the example, reference is made to a service referred to as IMS-Voice over IP (IMS-VoIP). However, it is to be understood that the same concepts could also be applied to other types of services, e.g. internet, Peer-to-Peer file sharing, MTV, or the like.

It is assumed that in normal operation of the communication network, i.e. if performance monitoring is not enabled, the service IMS-VoIP is mapped to QCI 1. If the operator of the communication network wants to monitor or measure a performance parameter, such as packet delay, packet loss, data throughput, or the like for the terminal 10 and for the service IMS-VoIP, this is signalled to the policy controller 30, which then maps the service IMS-VoIP to the monitoring bearer 54, e.g. associated with QCI 121, rather than mapping the service to a normal transport bearer associated with QCI 1. This reassignment may be initiated by the policy controller 30 on the basis of recognizing the identifier of the terminal and on the basis of a service identifier for IMS-VoIP as signalled over the signalling path 4. As a result, the data traffic of the terminal 10 relating to the service IMS-VoIP is tagged by QCI 121.

In this situation, one or more nodes between the gateway 26 and the terminal 10 may monitor the tagged data traffic by filtering data packets from the monitoring bearer 54. For this purpose, these nodes may be provided with the information that data traffic on the monitoring bearer 54 is to be monitored. For example, the QCI of the monitoring bearer 54, i.e. QCI 121, could be communicated to these nodes. In addition or as an alternative, a bearer identifier of the monitoring bearer 54 could be communicated to these nodes.

Further, nodes involved in setting up the monitoring bearer 54 may be configured in such a way that data traffic associated with QCI 121 is treated in the same way as traffic associated with QCI 1. That is to say, the QCI dedicated for monitoring purposes and the QCI of the normal transport bearer may be associated with the same traffic forwarding policy. Nodes which may monitor the data traffic on the basis of a bearer identity of the monitoring bearer 54, e.g. the QCI, or the bearer identifier, may be an enhanced Node B (eNB), a Serving Gateway (SGW) or Serving GPRS Support Node (SGSN), a Packet Data Network Gateway (PGW) or a GGSN.

As mentioned above, in addition to tagging the data traffic to be monitored by using the dedicated monitoring bearer 54 and the associated QCI, the data packets to be monitored may also be individually tagged so as to be visible in the transport network. For this purpose, the monitoring bearer 54 and the associated QCI are further mapped to a DSCP dedicated for performance monitoring purposes and included in an outer IP header of the data packets. By additionally using the dedicated DSCP, the data traffic to be monitored can be easily extracted on the basis of the DSCP in user plane nodes of the transport network.

Figure 7:
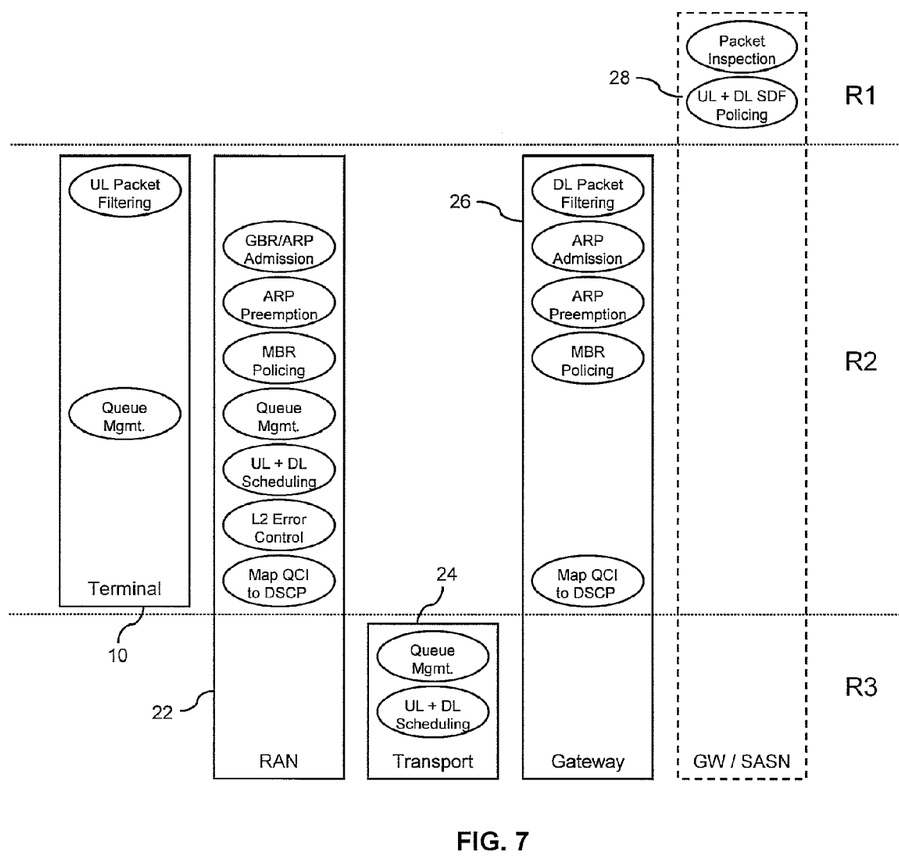
FIG. 7 shows a functional diagram of a mobile communication environment according to an embodiment of the invention.

FIG. 7 schematically illustrates a functional diagram of the communication network as illustrated in FIG. 1. The diagram of FIG. 7 includes a functional representation of the terminal 10, of the RAN 22, of the transport node 24 and of the gateway 26. Further, as illustrated by a dashed box, the diagram includes a functional representation of a Service Aware Support Node (SASN) 28. As a main function, the SASN 28 includes a service-sensitive packet inspection function. Further, the SASN 28 is responsible for enforcing UL and DL Service Data Flow (SDF) policies.

The gateway 26 accomplishes DL packet filtering, i.e. using the DL packet filters 72, 74 as illustrated in FIG. 1. Further, the gateway 26 accomplishes ARP admission, ARP pre-emption, MBR policing. Additionally, the gateway 26 accomplishes mapping between the QCI of the monitoring bearer and the DSCP dedicated for monitoring purposes.

The transport node 24 accomplishes queue management. Further, the transport node 24 accomplishes UL and DL scheduling of data packets.

The RAN 22 accomplishes MBR/ARP admission, ARP pre-emption, MBR policing, queue management, UL and DL scheduling of data packets, and Layer 2 (L2) error control. Further, the RAN 22 accomplishes mapping between the QCI of the monitoring bearer and the DSCP dedicated for monitoring purposes.

The terminal 10 accomplishes UL packet filtering and queue management.

In FIG. 7, the functions are illustrated in different regions R1, R2, and R3, which are separated by horizontal dotted lines. In the region R1, the functions operate on an SDF basis. In the region R2, the functions operate on a per bearer basis, i.e. on the basis of the bearer identity. In the region R3, the functions operate on the basis of the DSCP.

As can be seen from the illustration of FIG. 7, by having the mapping between the QCI and the dedicated DSCP in the RAN 22 and in the gateway 26, the data traffic to be monitored becomes visible in the transport network, i.e. in the transport node 24, as well. In the transport node 24, the data traffic to be monitored may be filtered from other data traffic on the basis of the dedicated DSCP.

Also in the case of FIG. 7, it is to be understood that for the purposes of illustration only one transport node 24 is shown, but a larger number of transport nodes may actually be present.

Figure 8:
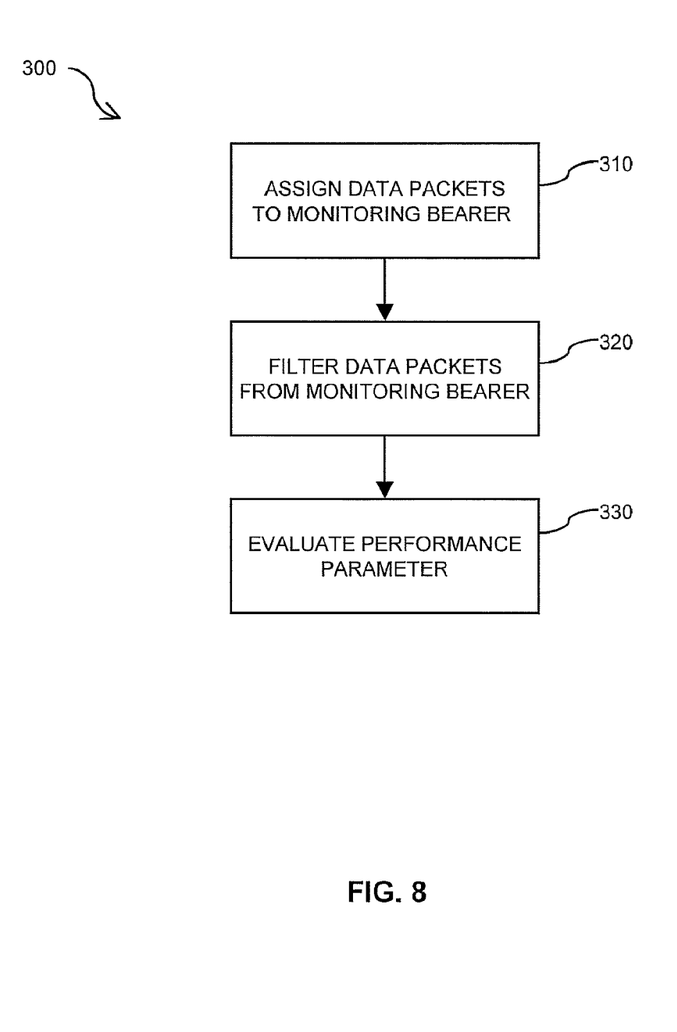
FIG. 8 shows a flowchart for illustrating a performance monitoring method according to an embodiment of the invention.

FIG. 8 shows a flowchart illustrating a method 300 of performance monitoring in accordance with the above-mentioned concepts.

In step 310, data packets to be monitored are assigned to a monitoring bearer, i.e. a bearer which is dedicated for monitoring purposes. This is accomplished in response to a triggering event, e.g. receiving an indication that data traffic related to a certain terminal identifier, such as an IMSI, data traffic of a certain user, and/or data traffic related to a certain service is to be monitored. Before the triggering event, the data traffic may be assigned to a corresponding transport bearer in the usual manner. The monitoring bearer and the corresponding transport bearer have the same traffic forwarding policy. In this way, the monitoring results will accurately represent the usual handling of network traffic.

In step 320, the data packets are filtered from the monitoring bearer. Since the monitoring bearer carries only data traffic to be monitored, no sophisticated filtering process is required at this stage.

In step 330, a performance parameter is evaluated on the basis of the filtered data packets, e.g. a data throughput, a packet delay, or a packet loss rate for a certain terminal and/or for a certain service.

According to the concepts as explained above, data traffic can be monitored in an efficient and reliable manner. In particular, a monitoring node does not need to process all data packets coming across this node, but merely the data packets communicated on the dedicated monitoring bearer, which significantly reduces the required processing resources. Further, the process of filtering the data packets from the data traffic is simple and can be implemented on the basis of a single protocol header field, e.g. the DSCP in an outer IP header.

It is to be understood that the concepts as explained above are merely exemplary and susceptible to various modifications. For example, the functionalities of the policy controller could be integrated in the gateway. Filtering of the data packets from the monitoring bearer may be accomplished at any node between the terminal and the gateway. The concepts of performance monitoring may be applied only in the DL direction, only in the UL direction, or both in the DL and UL direction. The above concepts may be applied in various types of mobile communication networks.

The invention claimed is:

1. A method of performance monitoring in a communication network, comprising:
    upon a triggering event, assigning data packets of a specific type to a monitoring bearer between a terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
    wherein the triggering event is based on policy data.

2. The method according to claim 1, wherein the policy data comprise a service identifier of the data packets, an identifier of said terminal, subscription data of a user of said terminal, a time of day, a day of week, and/or positioning data of said terminal.

3. The method according to claim 1, wherein the triggering event comprises usage of a specific service.

4. The method according to claim 1, comprising associating the monitoring bearer with a Quality of Service Class Identifier dedicated for performance monitoring purposes.

5. The method according to claim 1, comprising associating the monitoring bearer with a Differentiated Services Code Point to be included in an outer Internet Protocol header of said data packets, said Differentiated Services Code Point being dedicated for performance monitoring purposes.

6. The method according to claim 1, comprising filtering the data packets to be monitored from the monitoring bearer.

7. The method according to claim 6, comprising evaluating a performance parameter on the basis of the filtered data packets.

8. A network component, comprising:
a controller configured to detect a triggering event and, upon the triggering event, to assign data packets of a specific type to a monitoring bearer between a terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
wherein the controller is configured to detect the triggering event based on policy data.

9. The network component according to claim 8, comprising a signalling interface configured to indicate to at least one of said gateway and said terminal a mapping of data packets to the monitoring bearer.

10. A network component, comprising:
a monitoring filter configured to filter data packets of a specific type from a monitoring bearer between a terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
wherein the monitoring filter operates on the basis of a Differentiated Services Code Point, which is dedicated for performance monitoring purposes and included in an outer Internet Protocol header of the data packets.

11. A network component, comprising:
a gateway with a downlink filter section configurable to route data packets of a specific type to a monitoring bearer between the gateway and a terminal, said monitoring bearer being dedicated for performance monitoring purposes, wherein the monitoring bearer and a transport bearer for carrying data packets of said specific type between a non-monitored terminal and the gateway have the same traffic forwarding policy;
a packet encapsulator configured to provide an outer Internet Protocol header of the data packets with a Differentiated Services Code Point associated with the monitoring bearer, the Differentiated Services Code Point being dedicated for performance monitoring purposes.

12. A method of operating a controller in a communication network, the controller configured to detect a triggering event, the method comprising:
detecting the triggering event and assigning data packets of a specific type to a monitoring bearer between a terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
wherein the detecting the triggering event comprises detecting the triggering event based on policy data.

13. A method of operating a monitoring filter in a communication network, comprising:
filtering data packets of a specific type from a monitoring bearer between a terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
wherein the filtering comprises filtering on the basis of a Differentiated Services Code Point which is dedicated for performance monitoring purposes and included in an outer Internet Protocol header of the data packets.

14. A method of operating a gateway with a downlink filter section in a communication network, comprising:
routing data packets of a specific type to a monitoring bearer between the gateway and a terminal, said monitoring bearer being dedicated for performance monitoring purposes, wherein the monitoring bearer and a transport bearer for carrying data packets of said specific type between a non-monitored terminal and the gateway have the same traffic forwarding policy;
providing an outer Internet Protocol header of the data packets with a Differentiated Services Code Point associated with the monitoring bearer, the Differentiated Services Code Point being dedicated for performance monitoring purposes.

15. A terminal, comprising:
an uplink filter section configurable to route data packets of a specific type to a monitoring bearer between the terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
a packet encapsulator configured to provide an outer Internet Protocol header of the data packets with a Differentiated Services Code Point associated with the monitoring bearer, the Differentiated Services Code Point being dedicated for performance monitoring purposes.

16. A method of operating a terminal with an uplink filter section in a communication network, comprising:
routing data packets of a specific type to a monitoring bearer between the terminal and a gateway, said monitoring bearer being dedicated for performance monitoring purposes, wherein the monitoring bearer and a transport bearer for carrying data packets of said specific type between a non-monitored terminal and the gateway have the same traffic forwarding policy;
providing an outer Internet Protocol header of the data packets with a Differentiated Services Code Point associated with the monitoring bearer, the Differentiated Services Code Point being dedicated for performance monitoring purposes.

* * * * *